United States Patent
Kazerani et al.

(10) Patent No.: US 10,304,269 B2
(45) Date of Patent: *May 28, 2019

(54) MULTI-NETWORK ENTRY ACCESS SYSTEMS AND METHODS

(71) Applicant: OpenPath Security Inc., Marina Del Rey, CA (US)

(72) Inventors: Alexander A. Kazerani, Santa Monica, CA (US); Amir Reza Khakpour, Santa Monica, CA (US); Samy Kamkar, Los Angeles, CA (US); Robert J. Peters, Culver City, CA (US)

(73) Assignee: OPENPATH SECURITY INC., Marina Del Rey, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/707,764

(22) Filed: Sep. 18, 2017

(65) Prior Publication Data

US 2018/0253917 A1    Sep. 6, 2018

Related U.S. Application Data

(63) Continuation of application No. 15/448,105, filed on Mar. 2, 2017, now Pat. No. 9,767,630.

(51) Int. Cl.
*G07C 9/00* (2006.01)
*H04W 4/80* (2018.01)
(Continued)

(52) U.S. Cl.
CPC ...... *G07C 9/00111* (2013.01); *G07C 9/00309* (2013.01); *G07C 9/00571* (2013.01);
(Continued)

(58) Field of Classification Search
CPC ....... H04W 4/80; H04W 48/18; H04W 64/00; H04W 84/12; H04W 88/06; H04W 12/06;
(Continued)

(56) References Cited

U.S. PATENT DOCUMENTS

2013/0268766 A1* 10/2013 Schrecker ............... G06F 21/34
                                                                713/185
2014/0049361 A1   2/2014 Ahearn et al.
(Continued)

*Primary Examiner* — An T Nguyen
(74) *Attorney, Agent, or Firm* — Ansari Katiraei LLP; Arman Katireai; Sadiq Ansari

(57) ABSTRACT

Disclosed are systems and methods for performing entry access over two or more networks. The two or more networks are leveraged to accelerate the entry access and provide redundancy. Performance over each of the two or more networks is tracked in order to allow a mobile device to exchange entry access messaging over the particular network providing fastest start-to-unlock time. The mobile device can alternatively exchange the entry access messaging simultaneously over the two or more networks to create a race condition whereby the fastest start-to-unlock time is obtained without monitoring network performance. Performing the entry access messaging exchange over the two or more networks also ensures reliability in the event a particular network is down or congested, an authorization device on a particular network is down or overloaded, a radio of a mobile device communicating over a particular network is disabled or slow performing.

15 Claims, 9 Drawing Sheets

(51) Int. Cl.
*H04W 48/18* (2009.01)
*H04W 64/00* (2009.01)
*H04W 88/06* (2009.01)
*H04W 84/12* (2009.01)

(52) U.S. Cl.
CPC ............. *H04W 4/80* (2018.02); *H04W 48/18* (2013.01); *H04W 64/00* (2013.01); *G07C 2009/00769* (2013.01); *H04W 84/12* (2013.01); *H04W 88/06* (2013.01)

(58) Field of Classification Search
CPC ............... H04W 48/02; G07C 9/00309; G07C 9/00571; G07C 2009/00769; G07C 9/00023; G07C 9/00039; H04L 69/18
See application file for complete search history.

(56) References Cited

U.S. PATENT DOCUMENTS

| | | | |
|---|---|---|---|
| 2015/0271668 A1* | 9/2015 | Sun | H04W 12/04 455/411 |
| 2016/0267729 A1* | 9/2016 | Baumgarte | H04W 12/06 |
| 2016/0343185 A1 | 11/2016 | Dumas | |
| 2017/0034849 A1* | 2/2017 | Kanamarlapudi | H04W 72/14 |
| 2017/0069149 A1* | 3/2017 | Scheja | G07C 9/00023 |
| 2017/0163627 A1* | 6/2017 | Keisala | H04W 12/06 |
| 2018/0035245 A1* | 2/2018 | Thanayankizil | H04W 4/44 |
| 2018/0077592 A1* | 3/2018 | Kim | H04L 65/4069 |
| 2018/0220470 A1* | 8/2018 | Zacharias | H04W 76/15 |
| 2018/0253917 A1* | 9/2018 | Kazerani | G07C 9/00309 |

* cited by examiner

MULTI-NETWORK ENTRY ACCESS SYSTEMS AND METHODS

CLAIM OF BENEFIT TO RELATED APPLICATIONS

This application is a continuation of the U.S. non-provisional application Ser. No. 15/448,105, entitled "Multi-Network Entry Access Systems and Methods", filed Mar. 2, 2017.

BACKGROUND ART

Entry access security has evolved from the physical key and mechanical lock combination, to the smart or proximity keycard and electronic lock combination, and now to the mobile device and electronic lock combination. Two factors propelling this evolutionary shift are convenience and security.

Physical keys are neither convenient nor secure. Convenience was compromised as a result of having to carry different physical keys for different entry points, finding the correct key for the desired entry point, and inserting and manipulating the key within the mechanical lock in order to gain access. A new physical key would have to be obtained for a lost key. There was also no means by which access could be remotely granted or revoked by a security administrator. Security was especially problematic as a simple mechanical device found in almost any hardware store could be used to generate one or more copies of a key. This made it virtually impossible for a key issuer or security administrator to really know if a key recipient or others have truly lost access to the entry point when the key recipient returns the key. The expense and difficulty associated with rekeying the mechanical locks further exacerbated the security shortcomings associated with physical keys.

Smart keycards or proximity keycards provide added convenience to the user as well as the keycard administrator relative to physical keys. The keycard user could use the same keycard to access different entry points within the same or different buildings under common administration. Some keycards require a simple swipe through a reader and other require nearing the keycard to a reader (i.e., to within a few inches from the reader) to initiate a wireless unlock process. The keycard administrator could remotely grant or revoke access permissions to a keycard user without physically holding the user's keycard. The keycards also allowed administrators the ability to digitally track who accessed which door at what times.

As technology progresses, some of these conveniences have soured into inconveniences. For instance, the need to swipe or bring the keycard near a reader is not that different than having to retrieve a physical key for insertion in a mechanical lock. Moreover, the entire process of using the keycard in conjunction with the reader (e.g., swiping or bringing the keycard in range of the reader), having the reader initiate a message exchange with the keycard, the processing of the keycard information either at the reader or at a remote system, and the physical unlocking can still take a few seconds, thereby interrupting the user's motion and leaving the user waiting for the door to unlock or open.

With respect to security, smart keycards or proximity keycards do little to address the shortcomings of physical keys. The credentials providing users access to different entry points can be easily read and copied from one keycard to another with the copying becoming as easy, if not easier, than copying a physical key. In a Black Hat conference in 2015, keycard reproduction was demonstrated with a $10 device with the reproduction occurring in under one minute. This is especially problematic since a single keycard can be used to access multiple access point without the guesswork of having to locate the correct physical key.

Smartphones have become ubiquitous. Nearly everyone carries a smartphone with them wherever they go. Smartphones have multiple layers of security including code or biometric unlocking of the smartphone, secondary protections for accessing applications or user accounts, encryption of stored information, location verification in accessing applications, services, or data, private integrated circuits with identifying or decrypting information, etc. These security layers have made smartphones as safe, if not safer, to use for credit based transactions than physical credit cards with a magnetic stripe or integrated circuit. The wireless connectivity of a smartphone also makes the smartphone ideal for remote administration.

Although able to overcome many of the security shortcomings of keycards, the prior art usage of smartphones as access devices renders the smartphone no more or less convenient to use than keycards. Using a smartphone as an access device creates additional battery, processor, or bandwidth usage in order to wirelessly exchange messages with the entry point reader or security system. Current prior art usage of smartphones as access devices are no faster and are sometimes slower to use than keycards. Many current implementations require the same removal of the smartphone from a pocket, purse, or bag to initiate the unlock process once within a distance from the entry point reader. Many current smartphone based implementations adapt Internet protocols that have significant overhead and involve multiple message exchanges to perform the unlocking. This slows the unlock process relative to the simple messaging used for keycard based implementations. Other shortcomings with respect to convenience materialize in the implementation and user interface.

For these and other reasons, smart keycards or proximity keycards continue to dominate the market and remain, by a large margin, the access device of choice for most corporations. Accordingly, there is a need for improved convenience in using a smartphone as an entry point access device. More specifically, there is a need to improve the speed, reliability, and functionality of the smartphone as an access device without compromising security or the user's ability to use the smartphone for any other purpose whether because of battery drain, processor usage, bandwidth usage, or other resources utilized in using the smartphone as an access device.

BRIEF DESCRIPTION OF THE DRAWINGS

A preferred embodiment for multi-network entry access systems and methods will now be described, by way of example only, with reference to the accompanying drawings in which.

DETAILED DESCRIPTION

Provided are systems and methods for multi-network entry access, whereby entry access is performed using two or more different networks or connections. The multi-network implementation improves upon prior art single network entry access implementations by improving speed, reliability, and overall convenience of using a mobile device as an access device while retaining the security advantages of the mobile device relative to prior art smart keycards or proximity cards.

The mobile device for implementing one side of the multi-network entry access is any portable computing device with two or more radios (whether short-range or long-range), antennas, or transceivers and receivers for establishing connections and simultaneously or interchangeably communicating over two or more different networks. More specifically, the mobile device supports communications or messaging over two or more of Bluetooth, Bluetooth Low Energy (BLE), WiFi, 3G, 4G, Long Term Evolution (LTE), 5G, Radio-Frequency Identification (RFID), Near-Field Communication (NFC), ZigBee, Z-Wave, 6LoWPAN, Thread, Weightless, ANT, MIWI, Short Messaging Service (SMS), Multimedia Messaging Service (MMS), and other wireless networks or wireless communication protocols for differentiated network communication.

A preferred embodiment for the mobile device is a smartphone including those running the iOS, Android, or Windows operating systems. Other embodiments for the mobile device include tablets, laptop computers, Internet-of-Things (IoT) devices, and other wireless and portable devices supporting communications or messaging over two or more different networks.

Figure 1:
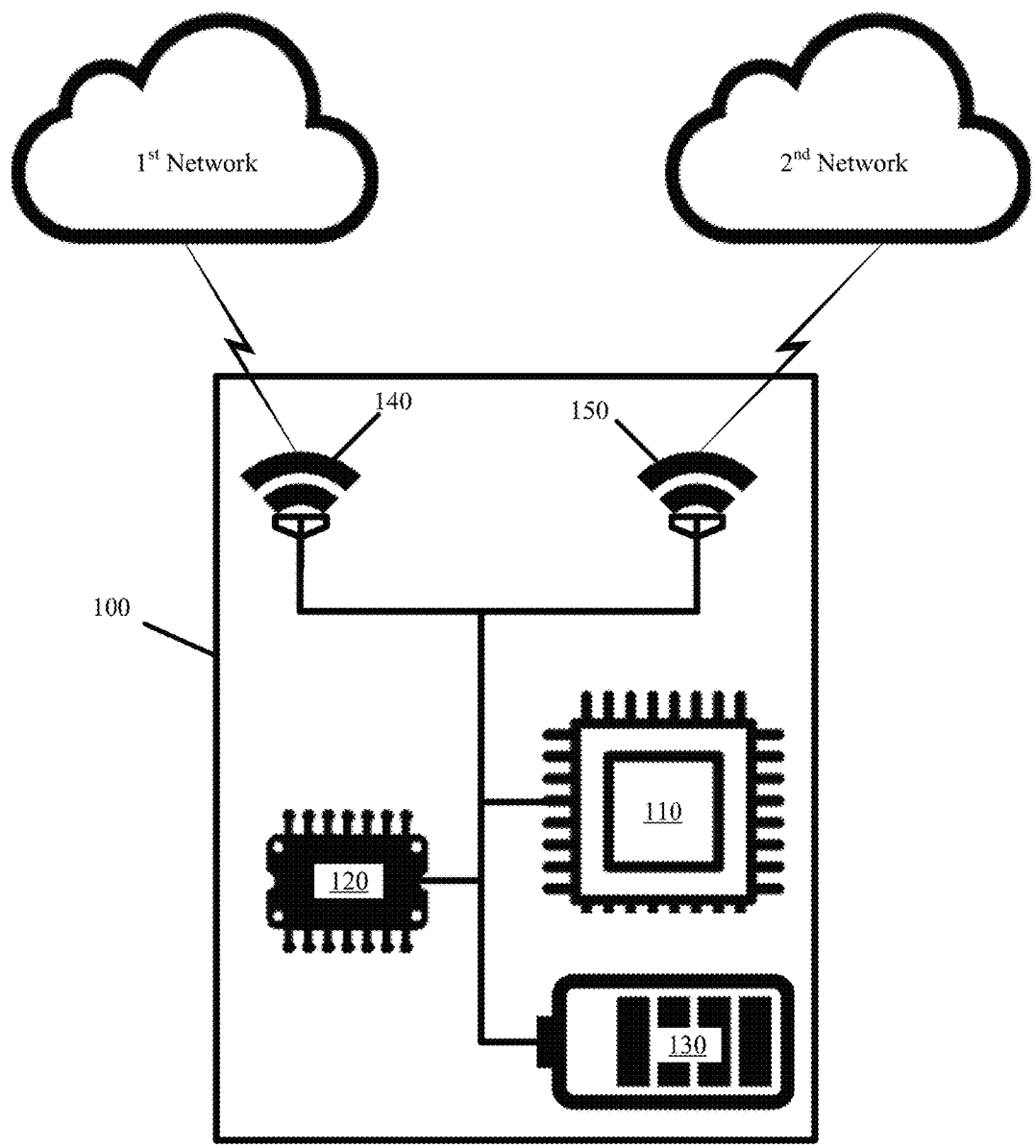
FIG. 1 illustrates a multi-network mobile device in accordance with some embodiments.

FIG. 1 illustrates a multi-network mobile device 100 in accordance with some embodiments. The multi-network mobile device 100 includes a processor 110, memory 120, a power source 130 (i.e., battery) and at least two different radios 140 and 150 or at least two different forms of network connectivity powered by the power source 130. These components exclude and differentiate the mobile device 100 of some embodiments from smart keycards or proximity keycards that are widely used today for entry access. In particular, the smart keycards or proximity keycards typically lack a local power source and connectivity across two or more networks. It should be noted that the multi-network mobile device 100 can exclude means with which to present output to a user (e.g., screen or display) or receive input directly from a user (e.g., keyboard, touchscreen, or other input buttons).

The memory 120 stores an application that adapts the mobile device 100 for multi-network network access entry. In particular, the application executes the client-side functionality. In some embodiments, the application is further configured with the credentials, tokens, or other access authorization information that grants the mobile device user access to different entry points. In preferred embodiments, the entry points include electronically lockable physical points of access such as doors, gates, cabinets, and lifts (e.g., elevators). In some other embodiments, the entry points include opening access to a device (e.g., logging in or unlocking an electronic device) or device activation (e.g., device power-on, remote starting, etc.). The application is executed by the processor 110 when the mobile device 100 is used for access entry or when application information is remotely modified or updated. Different internal and external triggers can be used to invoke the application execution. Some such external triggers are described below with reference to FIG. 3.

Entry access messaging sent from the multi-network mobile device 100 over the two or more networks are received at a corresponding multi-network entry access control system. The entry access messaging serves to establish a connection with a control system node, initiate a request to the node for access to an entry point, verify identity of the requestor (i.e., mobile device or user), authorize the requestor's access to the entry point, and unlock or open access to the entry point if authorized. The messaging sequence and contents of the messages differ based the access authorization methodology implemented by the multi-network entry access control system. In some embodiments, the entry access messaging involves the mobile device initiating a request to access a particular entry point. The request includes a first unique identifier identifying the mobile device or the user seeking access, wherein the user identification can be stored and provided by the application running on the mobile device. The first unique identifier can be an alphanumeric value that is encrypted or decrypted and can include the mobile device telephone number, International Mobile Subscriber Identity (IMSI), or login credentials of the user as some examples. The entry access messaging can further involve a second unique identifier identifying the entry point that the user seeks to access. Each entry point will have unique identification. In some embodiments, the initial request or subsequent messages from the mobile device provide a token or other credentials that authorize access to the entry point. The control system authorizes access based on the identifiers in the request and based on credentials provided by the mobile device or credentials that are stored in the control system and access using the provided identifiers. In some embodiments, the entry access message exchanges are encapsulated as HyperText Transfer Protocol (HTTP) or HTTP Secure (HTTPS) POST, PUT, and GET messages. In some embodiments, the exchanges occur over secure and encrypted connections, such as a Transport Layer Security (TLS) connection.

Figure 2:
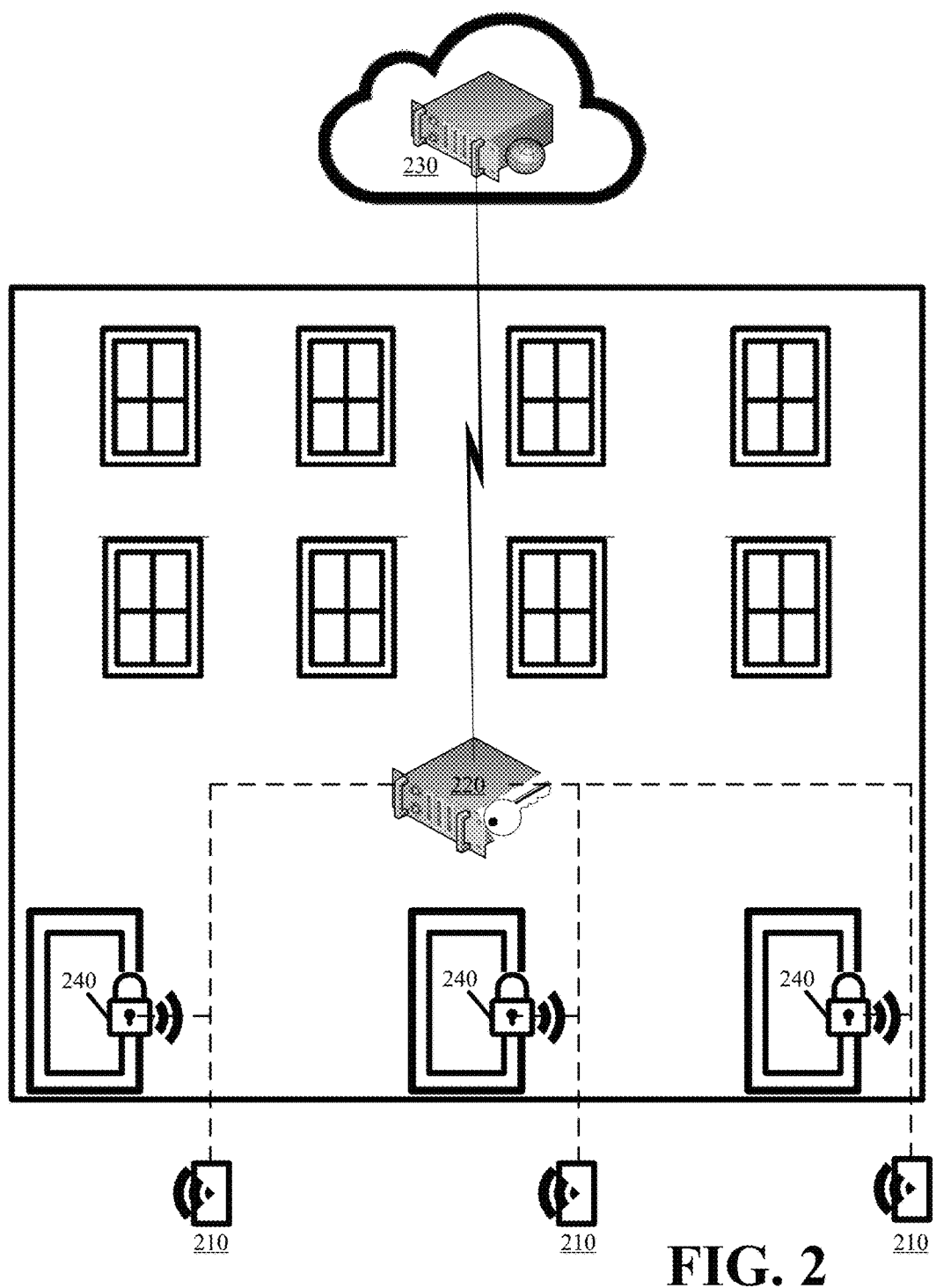
FIG. 2 conceptually illustrates a multi-network entry access control system in accordance with some embodiments.

FIG. 2 conceptually illustrates a multi-network entry access control system 200 in accordance with some embodiments. The multi-network entry access control system 200 is formed from a set of readers 210, an access control unit 220, and a remote administrative server 230. The multi-network entry access control system 200 is linked to and controls a set of electronic locks 240 that open and close access to one or more physical entry points (e.g., doors, cabinets, windows, etc.) in one or more buildings.

The set of readers 210 are wireless devices placed adjacent to the physical entry points that users attempt to access using their mobile devices. Each reader 210 is linked to an entry point. In some embodiments, an electronic lock 240 for a particular entry point is integrated with the reader 210 for that particular entry point. In some other embodiments, the electronic locks 240 are physically decoupled from the set of readers 210.

Each reader 210 includes at least one wireless radio for communicating with user mobile devices over at least one of the supported networks. Typically, the at least one wireless radio of the reader 210 is a short-range low-power radio such as Bluetooth, BLE, NFC, or RFID. The at least one wireless radio of the reader 210 could alternatively include a longer-range or higher-powered radio. The reader 210 may include two or more such radios for communicating with the mobile devices in case mobile devices do not support or have disabled one or more of the radios.

Each reader 210 may further include a wireless radio or wired connection for back-haul communications with the access control unit 220 or electronic lock 240 of a corresponding entry point. The back-haul communications allow the set of readers 210 to operate in a standalone mode or networked mode.

To support a standalone mode of operation, each reader 210 has processing logic with which to authorize user access. Each reader 210 also maintains a wired or wireless connection to a corresponding electronic lock 240 to send unlock signals directly to the corresponding electronic lock 240 upon successful user or mobile device authorization by the reader 210. When a mobile device is within the network range of the reader 210, the reader 210 can wirelessly exchange access entry messaging with the mobile device and locally perform an access decision that controls the locking or unlocking of the electronic lock 240 for the physical entry point associated with the reader without further communications back to the local access control unit 220. In other words, the reader 210 determines if the mobile device (or user associated with the mobile) should be granted access to the adjacent physical entry point, and opens access to the physical entry point by sending an unlock message to the electronic lock 240 associated with the physical entry point if access is granted.

To support a networked mode of operation, each reader 210 has, in addition to the wireless radio for communications with mobile devices, a wired or wireless connection to the access control unit 220 or the remote administrative server 230. In the networked mode of operation, each reader of the set of readers 210 continues to exchange access entry messaging with mobile devices that come in network range of the reader 210. However, the access decision need not be performed at the reader 210. Instead, the reader 210 can pass the access entry messaging to the local access control unit 220 or remote administrative server 230. The local access control unit 220 or remote administrative server 230 determines if the mobile device or corresponding user is permitted access to the physical entry point linked to the reader 210. If so, the access control unit 220 or remote administrative server 230 opens access to the physical entry point by sending the unlock message to the electronic lock associated with the physical entry point. In some other embodiments, the access control unit 220 performs user or mobile device authorization on behalf of the reader 210 and sends the authorization result to the reader 210. The reader 210 can then issue lock and unlock signaling to an electronic lock based on the access control unit 220 provided authorization result.

The mobile device-to-reader communications described in the standalone and network modes of reader operation occur using a first network connection or first radio of the mobile device. In some embodiments, a second network connection or second radio of the mobile device is used to directly communicate and exchange messaging with the access control unit 220. The second network connection is typically conducted over WiFi when the mobile device is within range of a WiFi access point in the same building as the access control unit 220.

The access control unit 220 is a network connected server or machine. In some embodiments, the access control unit 220 is located in the same building as the physical entry points that the access control unit 220 has control over. The access control unit 220 allows a business or administrator to control and manage access permissions for the various physical entry points in the building. The access control unit 220 exchanges access entry messaging with mobile devices over the second connection in order to authorize the mobile devices access to different entry points of the building. In some embodiments, the access control unit 220 is communicatively coupled to the electronic locks 240 and issues the unlock and lock messages to the electronic locks 240 based on successful authorization of the mobile devices. In some embodiments, the access control unit 220 is also communicatively coupled to the set of readers 210 in order to receive messaging from them when the set of readers 210 operates in the networked mode of operation, or to configure the readers 210 with the access authorization information when the set of readers 210 operates in the standalone mode of operation. The access control unit 220 also has a connection with the remote administrative server 230 in order to receive updates and/or issue access credentials to user mobile devices.

In some embodiments, a third network connection or third radio of the mobile device is used for communications between the mobile device and the remote administrative server 230, wherein the third network connection is different from at least one of the first network connection to the set of readers 210 and the second network connection to the access control unit 220. LTE is preferred for the third network connection. LTE provides an always-on connection to the mobile device.

The remote administrative server 230 is a cloud based system for managing mobile device access permissions. In some embodiments, the remote administrative server 230 issues and revokes credentials, tokens, or other messaging used by the mobile device to access different entry points. In some embodiments, the access permissions to different physical entry points for a specific user or mobile device of the user are generated or modified at the local access control unit 220. The access permissions are propagated to the remote administrative server 230 for remote distribution to that mobile device using the always on third network connection to the mobile device. In some other embodiments, the access permissions are generated or modified at the remote administrative server 230 that then propagates the access permissions to the mobile devices as well as the local access control unit 220 in control over the physical entry points implicated by the access permissions. In some embodiments, various functionality of the remote administrative server 230 can be duplicated or moved to the local access control unit 220 for redundancy purposes or to provide a private access control system. Similarly, various functionality of local access control unit 220 can be duplicated or moved to the remote administrative server 230 for redundancy purposes or to provide a pure cloud-based implementation.

In addition to the exchange of access permissions, the mobile device may exchange access entry messaging for a particular physical entry point with the remote administrative server 230 over the third network connection or third radio. In some embodiments, the remote administrative server 230 forwards the access entry messaging to the appropriate access control unit 220 where an entry decision can be made regarding the mobile device's permissions (or the permissions of mobile device user) for access to the particular physical entry point. The access control unit 220 can then send the unlock messaging to the electronic lock associated with the particular physical entry point if the mobile device is authorized. As will be described with respect to the figures below, this third manner of network access is provided for redundancy purposes and also for increased range and early unlocking as a result of the virtually unlimited range from which the mobile device can unlock an entry point using the LTE or other long-range network connection with the remote administrative server 230.

Figure 3:
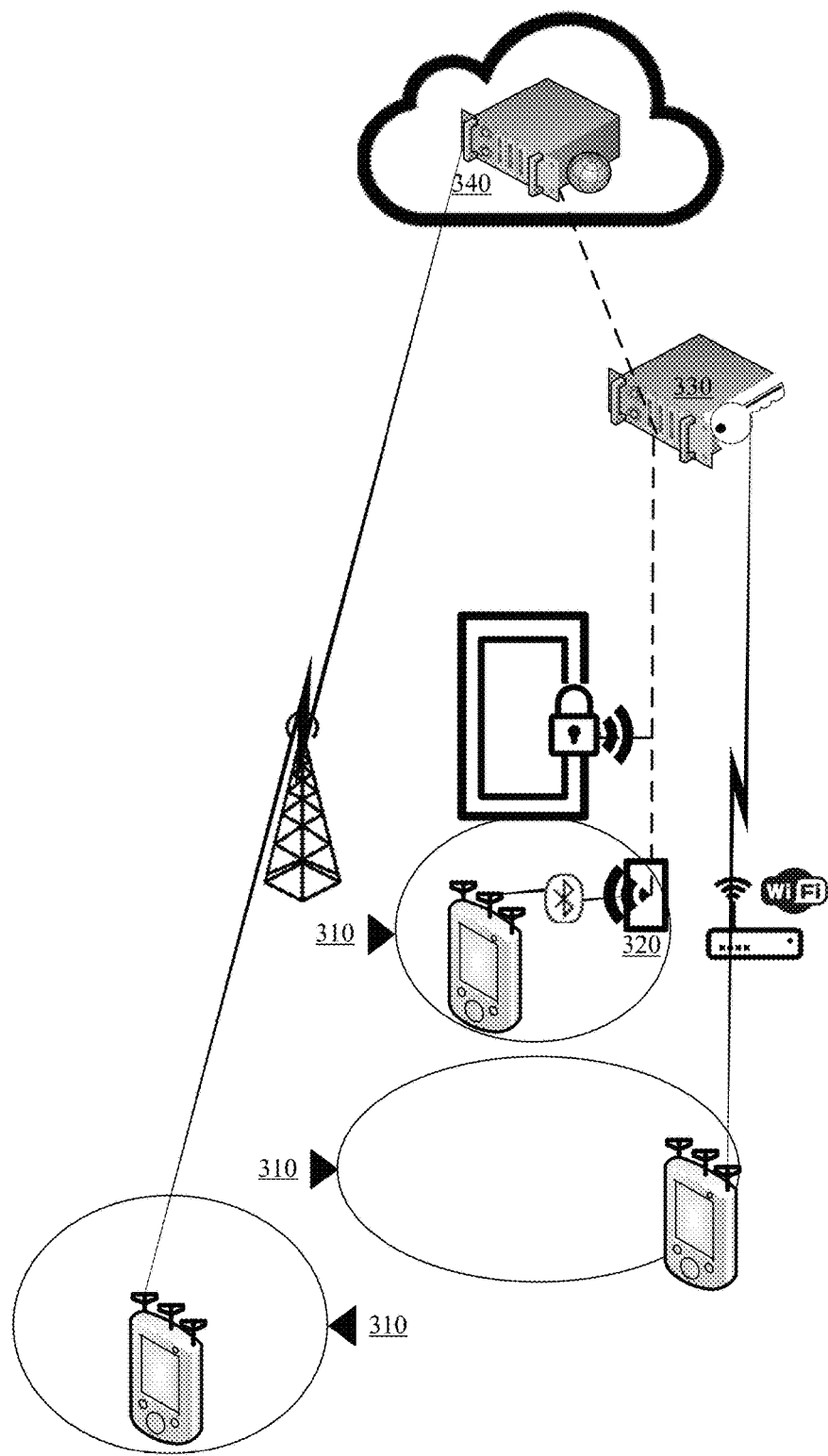
FIG. 3 conceptually illustrates the multi-network entry access control system with an optional set of beacons in accordance with some embodiments.

FIG. 3 conceptually illustrates the multi-network entry access control system with an optional set of beacons 310 in accordance with some embodiments. The beacons 310 provide triggers that commence application execution on the mobile device. As shown, the trigger provided by each particular beacon of the set of beacons 310 causes a mobile device receiving the particular beacon trigger to exchange entry access messaging over a particular network with a specific one of the reader 320, access control unit 330, or remote administrative server 340. In some other embodiments, the provided trigger can cause the mobile device to simultaneously exchange entry access messaging over two or more networks with two or more of the reader 320, access control unit 330, and remote administrative server 340 of the multi-network entry access control system. The beacon signal can therefore be more than a simple trigger and provide an identifier for the network or component to communicate with as well as the action to perform.

In some embodiments, the beacons are physical transmitters. The transmitters continuously broadcast a signal over one or more networks that mobile devices listen on. The broadcast signal is the trigger for initiating the entry access messaging from the mobile devices in range of the signal or for initiating network connection establishment between the mobile devices and a nearby reader or other device of the multi-network access control system. In some embodiments, the beacon signal passes the identifier associated with a nearby reader or entry point so that the mobile device is made aware of the reader or entry point and can initiate the entry access messaging if configured to do so. The beacons can broadcast the signal using one or more of RFID, Bluetooth, BLE, NFC, WiFi, and other networks. The physical beacons may be located next to different physical entry points under control of the multi-network entry access control system. The beacons can be placed in or on walls, floors, ceilings, etc. The beacons may be integrated as part of the multi-network access control system readers or may be separate devices. The beacons can also be other nearby mobile devices or other IoT devices.

In some embodiments, the beacons are virtual beacons. Virtual beacons can be triggers configured on the mobile devices. In some such embodiments, the control system application running on a mobile device is configured with one or more geocoordinates, regions, or landmark identifiers to specify when different triggers are to fire. For instance, when the mobile device enters a first designated space or region, a first virtual beacon configured for that space or region fires causing the mobile device application to commence entry access message exchanges over a first network using a first radio of the mobile device. As the mobile device moves into a second designated space or region, a second virtual beacon configured for that second space or region fires causing the mobile device application to commence entry access message exchanges over a different second network using a different second radio of the mobile device. The virtual beacons can also specify which device of the multi-network access control system (e.g., reader, access control unit, or remote administrative server) the mobile device is to exchange messaging with. Triggering of a virtual beacon can also cause the mobile device to send out its identifier or a service discovery signal. In such cases, the virtual beacon initiates the mobile device search for a device of the multi-network access control system, wherein the search can involves attempts to establish a connection with one or more devices of the multi-network access control system. Other virtual beacons providing internal triggers can be based on the mobile device identifying and automatically joining specific networks or establishing a connection with a reader, access control unit, or remote administrative server through a joined network. For instance, if a mobile device receives a Bluetooth identifier identifying a reader of the multi-network entry access control system, that Bluetooth identifier can trigger the mobile device in exchanging entry access messaging with the identified reader over Bluetooth.

The beacons, whether physical or virtual, allow for automatic initiation of the entry access messaging. The mobile device user does not have to operate or otherwise access the mobile device because of the beacons and associated triggers automating initiation of the entry access messaging. In other words, the user can leave the mobile device in a pocket, purse, or other bag and a locked entry point will be unlocked due to the triggers and automated initiation of the entry access messaging.

As noted above, the beacons are optional components of the multi-network entry access control system. User initiated actions can generate internal triggers for commencing entry access message exchanges with one or more networks. The user initiated actions can include a user unlocking his/her mobile device using biometric input (e.g., fingerprint scan, iris scan, facial scan, voice scan, etc.), performing a gesture that involves drawing a pattern, entering a code, touching, flicking, swiping, or tapping the phone in a defined manner, performing a specific button press combination, or manipulating the phone by rotating, tilting, shaking, or changing phone orientation. These internal triggers initiate the entry access message exchange from the mobile device application in response to action taken by the user.

Some embodiments use the internal triggers in conjunction with the above described beacon based triggers for completing a two-phase authorization of the user or mobile device. The first phase is trigged with a beacon and without user action. The beacon (i.e., physical or virtual) may trigger the first phase while the user or mobile device is still some distance from a nearby entry point. During the first phase, entry access messaging is exchanged to authorize the mobile device or user. More specifically, the identity of the mobile device or user associated with the mobile device is authenticated based on identifiers or credentials passed from the mobile device to one or more of the system readers, access control unit, or remote administrative server. The first phase also performs the access control decision to authorize whether the identified mobile device or user has access to the nearby entry point. Even if authorized at the completion of the first phase, access to the entry point is not granted until completion of the second phase. To complete the second phase, the user performs an action on the mobile device. In response to the user initiated action, the mobile device sends an access request to the system reader, access control unit, or remote administrative server. The request includes an identifier or token identifying the mobile device or user. The system device receiving the request grants immediate access based on the already completed first phase and successful authorization made at that time.

One of the primary objectives of the multi-network entry access control system is to accelerate and improve the time-to-unlock to different entry points using a mobile device. Even accelerating the time-to-unlock by a few milliseconds can be the difference between the user having to stop at the entry point upon arrival for the unlocking to complete, and the user being able to walk through the entry point uninterrupted as a result of the unlocking having completed prior to the user's arrival. This difference is significant in terms of convenience and actual functionality. The multi-network entry access control system achieves the speed improvement by performing the access entry exchanges and authorization between the mobile device and two or more of the readers, access control unit, and remote administrative server of the system over two or more networks per the methodologies and embodiments below.

Figure 4:
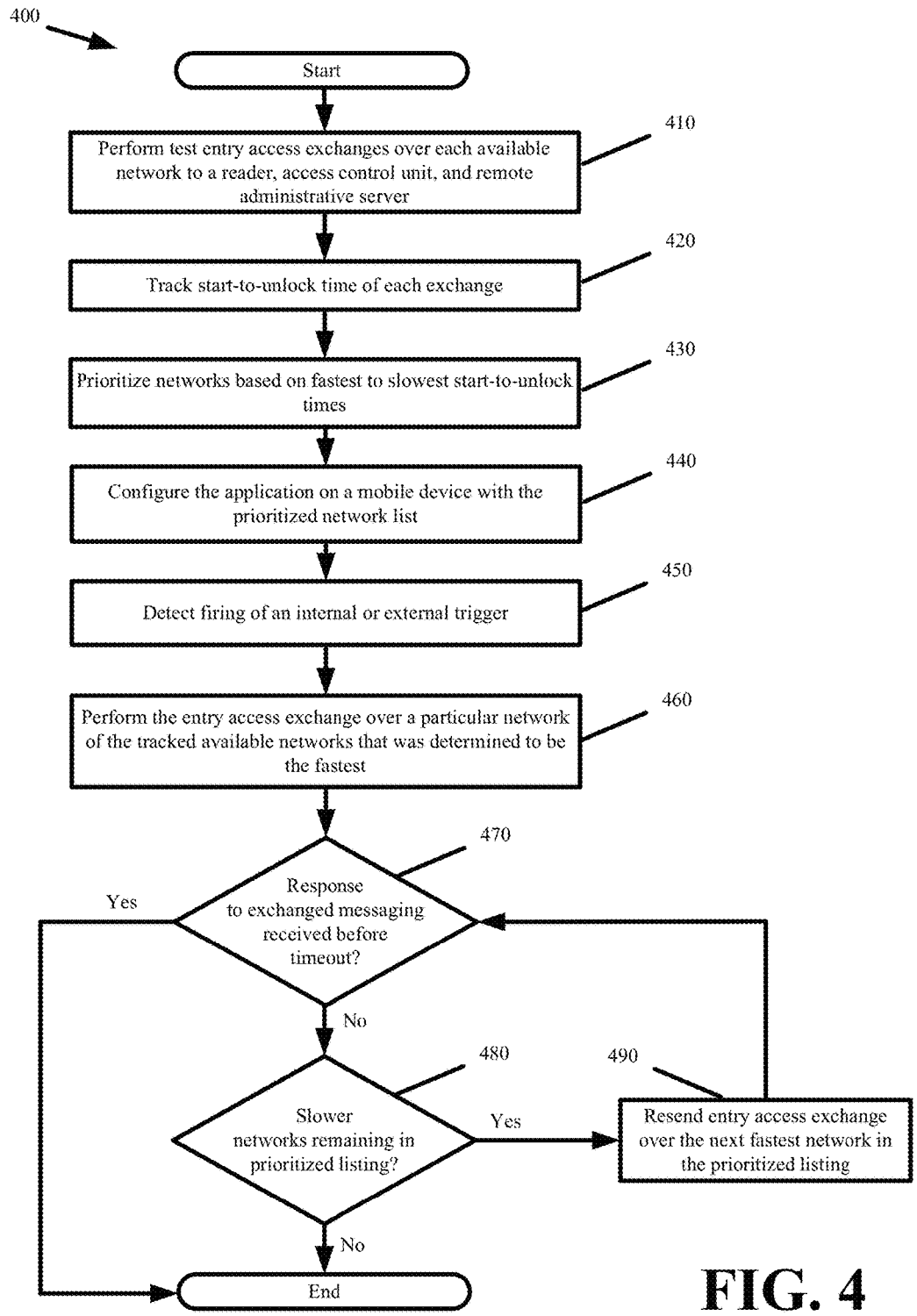
FIG. 4 presents a process for accelerating entry access using multiple networks in accordance with some embodiments.

FIG. 4 presents a process 400 for accelerating entry access using multiple networks in accordance with some embodiments. Process 400 accelerates entry access by tracking and selecting to perform entry access over a fastest available network. Process 400 may be performed by a mobile device of a user seeking access to one or more entry points under control of the multi-network entry access control system of some embodiments.

The process 400 commences by performing (at 410) test entry access exchanges over each available network to a reader, access control unit, and remote administrative server of the multi-network entry access control system. In particular, the mobile device sends a first test request over a first network to the reader, a second test request over a second network to the access control unit, and a third test request over a third network to the remote administrative server. The exchanges performed at step 410 can involve test messaging that simulates an actual request to open access to an entry point without actually unlocking access at completion of a successful exchange. The mobile device can issue the test messaging periodically or when the networks become available to the mobile device.

The process tracks (at 420) the start-to-unlock time of each exchange. In some embodiments, the start-to-unlock time takes into account when the entry access exchange can commence for each network and the amount of time for the mobile device to join the different networks, perform handshaking to establish connections over the different networks to different endpoints (i.e., reader, access control unit, or remote administrative server), exchange access entry messaging over the established connections, verify access to a particular physical entry point at each endpoint, and unlock the electronic lock associated with the particular entry point over the different networks, wherein the time for each of these steps can vary based on network congestion, available bandwidth, messaging protocol overhead, and system usage (e.g., number of mobile devices simultaneously requesting access from the access control unit as opposed to an individual reader). For instance, the entry access exchange can commence at a greater distance from the particular entry point over an LTE network than over a Bluetooth network even though there may be greater delay to reach an endpoint over the LTE network than over the Bluetooth network. Similarly, connecting to a Bluetooth network takes a different amount of time than connecting to an LTE network while bandwidth, messaging protocol overhead, network congestion, network reliability, and processing power further alter the amount of time for the authorization and unlocking to complete over the different networks.

The process prioritizes (at 430) the networks based on fastest to slowest start-to-unlock times. The process then configures (at 440) the application on a mobile device with the prioritized network list.

The process continues in response to firing (at 450) of an internal or external trigger. The trigger causes the process to perform (at 460) the entry access exchange over a particular network of the tracked available networks that was determined to be the fastest. For example, when the mobile device comes in a range of a beacon, the beacon sends a trigger that causes the mobile device to exchange entry access messaging over a Bluetooth network to a nearby reader if the Bluetooth network was determined at step 420 to have the fastest start-to-unlock time or over a WiFi network to the access control unit if the WiFi network was determined at step 420 to have the fastest start-to-unlock time.

The process waits for a timeout interval to determine (at 470) if a response to the exchanged messaging is received. The messaging exchange can involve sending an unlock request from the mobile device over the selected network with the response requesting additional information or credentials from the mobile device. Alternatively, the exchanged messaging can provide all information needed to authorize the user or mobile device for access to the desired entry point with the response providing conformation that the messaging was received, an authorization or rejection reply, or unlocking of the desired entry point.

If the response to the entry access exchange is received before the timeout interval, the process ends. If no response occurs before the timeout interval, the process checks (at 480) if other slower networks remain in the prioritized listing. If all networks in the prioritized listing have been exhausted, the process ends. Otherwise, the process resends (at 490) the entry access messaging over the next fastest network in the prioritized listing. The process reverts to step 470 and if a response again does not arrive before the timeout interval, the process performs the entry access exchange over the next fastest network in the prioritized listing until all networks are exhausted or a desired response is received.

As noted above, steps 410-440 can be periodically performed when the mobile device is within range of the different networks (whether or not entry access is performed). Periodically performing these steps ensures that the mobile device has an up-to-date and dynamic prioritized listing that accounts for current network conditions, network and component failures, mobile device connectivity issues, as well as mobile device resource availability. In some embodiments, steps 410-440 are performed remote from the user mobile device. For instance, the system may deploy test agents within range of the different networks and periodically activate the test agents to simulate the entry access exchanges performed by a mobile device and track the performance across the different networks. The results from the test agents pass to the remote administrative server. The remote administrative server can then update user mobile devices using the always-on connection to the mobile devices, wherein the remote administrative server provides the mobile devices with updated network start-to-unlock times for the different networks or an updated prioritized listing of the networks.

Figure 5:
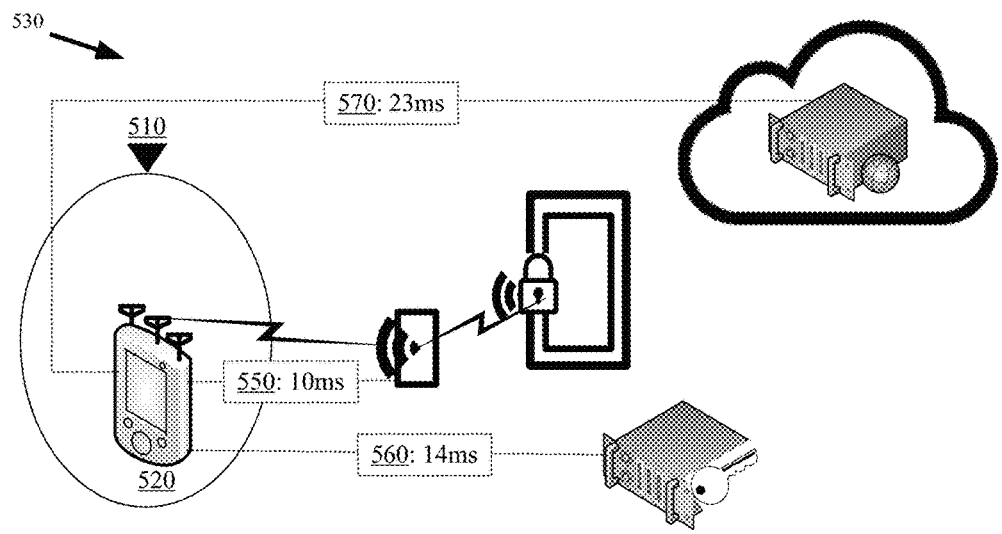
FIG. 5 conceptually illustrates accelerating entry access based on a dynamic and changing prioritization of two or more available networks over which entry access can be performed in accordance with some embodiments.
Figure 5:
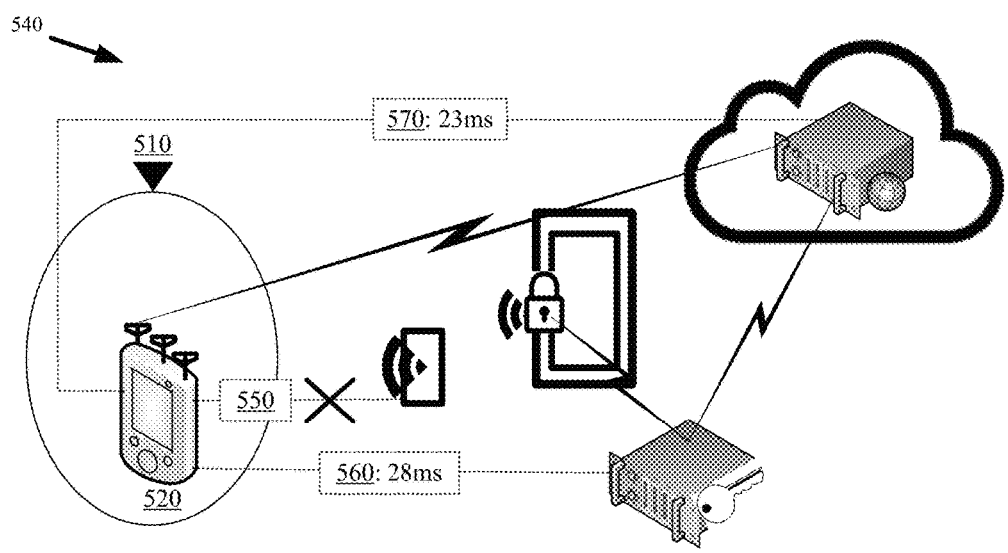

FIG. 5 conceptually illustrates accelerating entry access based on a dynamic and changing prioritization of two or more available networks over which entry access can be performed in accordance with some embodiments. The figure illustrates a beacon 510 triggering entry access by a mobile device 520 at a first time 530 and at a later second time 540. The figure further illustrates different prioritization of three available networks 550, 560, and 570 over which entry access can be performed at the first time 530 and the second time 540.

The first network 550 is prioritized over the second network 560 and the second network 560 is prioritized over the third network 570 when the mobile device 510 receives the beacon trigger at the first time 530. In response to the trigger and the prioritized listing of the networks at the first time 530, the mobile device 510 exchanges entry access messaging over the first network 550 determined to provide fastest start-to-unlock time of the three networks 550-570 at the first time 530.

However, by the second time 540, there is a detected failure on the first network 550 and increased congestion on the second network 560. Therefore, in response to the trigger and the updated prioritized listing of the networks at the second time 540, the mobile device 510 exchanges entry access messaging over the third network 570 determined to provide fastest start-to-unlock time of the three networks 550-570 at the second time 540.

Figure 6:
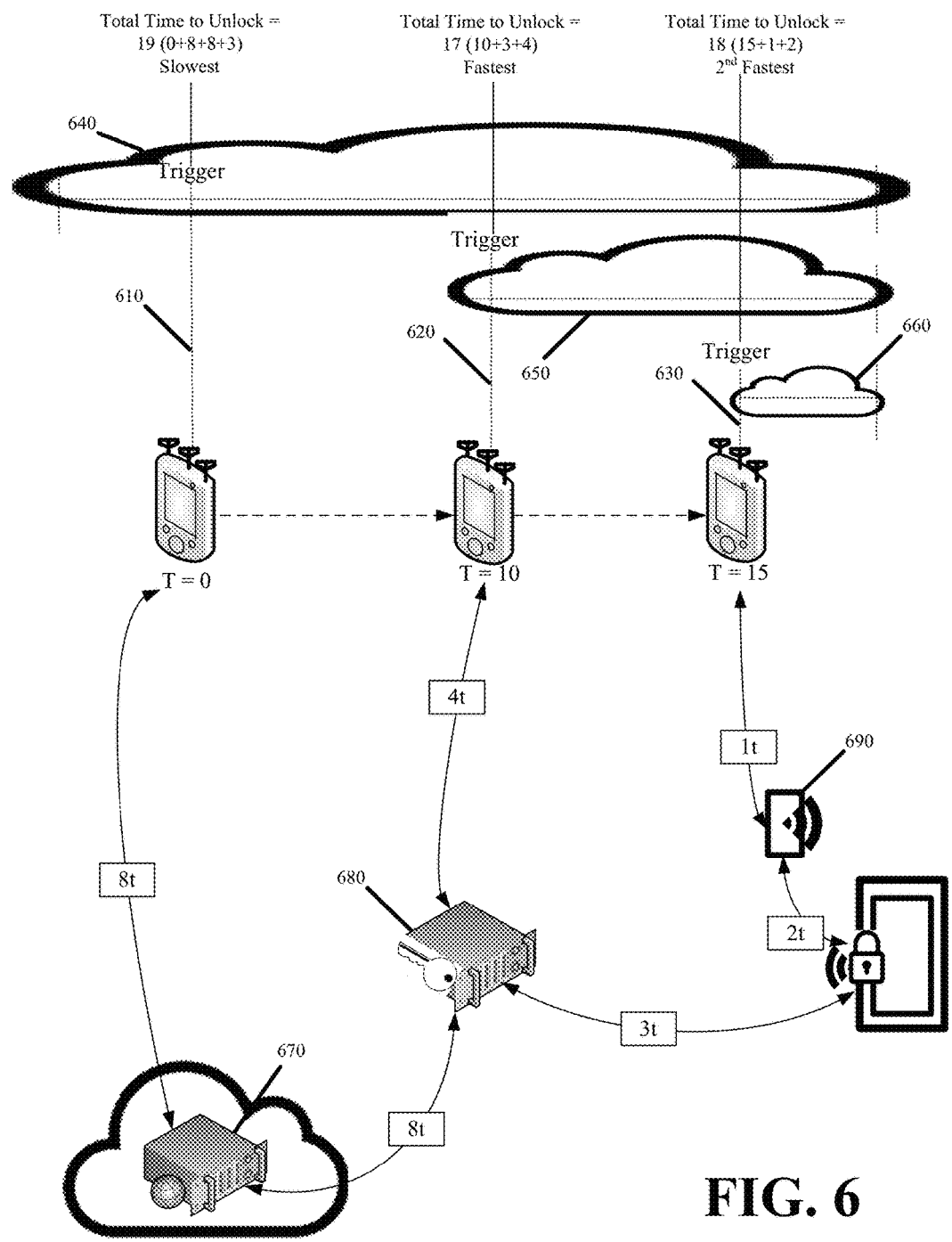
FIG. 6 conceptually illustrates accelerating entry access by performing entry access exchanges across multiple networks as the different networks become available in accordance with some embodiments.

Not all networks may be available at the same time. In such situations, waiting for the fastest start-to-unlock network to become available while other slower start-to-unlock networks are available could result in slower overall unlocking or entry access. Accordingly, some embodiments accelerate entry access based on the sequence with which the two or more networks become available to the mobile device seeking access. FIG. 6 conceptually illustrates accelerating entry access by performing entry access exchanges across multiple networks as the different networks become available in accordance with some embodiments. FIG. 6 illustrates a mobile device at three different positions 610, 620, and 630, the entry access exchanges that the mobile device performs at each of the positions 610, 620, and 630, and the total time each exchange takes.

At the first position 610, the mobile device is in range of an LTE network (i.e., a first network 640), but not a WiFi network (i.e., a second network 650) of a building the user seeks to access or the Bluetooth network (i.e., a third network 660) from a reader adjacent to the building entry point. From the first position 610, the mobile device initiates a first entry access exchange over the LTE first network 640. The first entry access exchange may be trigged based on user input to the mobile device, a beacon, or other internal or external trigger determining that the user is attempting to access the building entry point.

The first entry access exchange is with the remote administrative server 670. The remote administrative server 670 communicates the first entry access exchange from the mobile device to the access control unit 680 of the building to determine whether the user is permitted entry to the entry point and to unlock the entry point if authorized. In some other embodiments, the first entry access exchange can be routed from the LTE network over the Internet to the access control unit 680 of the building and bypass the remote administrative server 670. In either scenario, the first entry access exchange involves traversing multiple network hops and large geographic distances that slow the completion of the entry point unlocking over the first network 640.

As the first entry access exchange occurs, the user may move and position the mobile device at the second position 620. At the second position 620, the mobile device is in range of the building WiFi network (i.e., second network 650). The mobile device is within range of the WiFi network 650 when the mobile device detects a Service Set Identifier (SSID) that is broadcast from a WiFi entry point of the building or when the mobile device successfully connects to the building WiFi network 650. In this figure, the SSID detection or WiFi connection establishment serve as the trigger for initiating a second entry access exchange over the WiFi or second network 650. Other internal or external triggers could also trigger the second entry access exchange.

The WiFi network 650 places the mobile device and the access control unit 680 in the same Local Area Network (LAN). Accordingly, the second entry access exchange can be conducted directly between the mobile device and the access control unit 680 of the building over the second network 650 without traversing the Internet, a Wide Area Network (WAN) or other external networks. The exchange over the second network and LAN occurs with significantly fewer network hop traversals than the first entry access exchange and can eliminate the overhead associated with encrypted communications. Nevertheless, there is still some delay for the second entry access exchange to complete.

The mobile device continues to move to the third position 630 after initiating the first and second entry access exchanges. At the third position 630, the mobile device is within range of the reader's Bluetooth third network 660. The mobile device is within range of the Bluetooth network 660 when the mobile device detects the reader name over the Bluetooth network 660 or other identifier indicating connectivity with the reader 690. The mobile device can then initiate a third entry access exchange with the reader 690. The reader may be able to locally authorize user access and may be directly connected to the entry point electronic lock to minimize the unlocking delay.

Due to a variety of factors (e.g., network congestion, device loads, resource unavailability, etc.), any of the first, second, and third entry access exchanges may be pending while the other exchanges are initiated. Moreover, any of the first, second, and third entry access exchanges can complete ahead of the others regardless of when each is initiated. As shown, the first entry access exchange over the first network 640 is initiated first but completes last, the second entry access exchange over the second network 650 is initiated second and completes first, and the third entry access exchange over the third network 660 is initiated last and completes second. In this manner, the methodology for performing entry access exchanges across multiple networks as the different networks become available accelerates entry access. In particular, the methodology finds the fastest means for authorizing a user or mobile device for access and unlocking the accessed entry point ahead or at the time the user arrives at the secure entry point.

The methodology illustrated by FIG. 6 involves initiating duplicative entry access exchanges from the same mobile device over the different networks. The multi-network entry access control system accounts for the duplicative entry access exchanges. The system tracks the first completed exchange, wherein the first completed exchange is the first exchange that authorizes the user access and unlocks the corresponding entry point in response to successful authorization of the user, wherein the unlocking involves sending a secure signal to the electronic lock controlling access to the entry point. In some embodiments, completion of the exchange may further involve logging the time, the user, and the entry point accessed by the user. The system then identifies the duplicative and pending exchanges initiated by the same mobile device and ignores or stops processing those exchanges. In some embodiments, the electronic lock associated with an entry point logs user accesses and contains logic to ignore later arriving duplicative requests from the same user for the same entry point that are within a timeout interval. In some other embodiments, the access control unit controls the locking and unlocking of the electronic lock and can optionally perform the access authorization decision for a user on behalf of the remote administrative server and one or more readers. Accordingly, all requests initially exchanged with the remote administrative server or one or more readers route through the access control unit before any unlock signal is issued to an electronic lock. In some such embodiments, the access control unit can identify the later arriving duplicative requests from the same user for the same entry point that are within a timeout interval.

In some embodiments, the identification of the duplicative exchanges is based on performing the user authorization for each entry access exchange initiated by the mobile device at the access control unit, wherein each of the first, second, and third entry access exchanges provide the same mobile device or user identifier and the same entry point identifier. After successfully completing one of the received exchanges, the access control unit can maintain a timeout interval whereby subsequent exchanges from the same user or mobile device directed to the same entry point are ignored. In scenarios in which the authorization of different exchanges are performed at different system components (e.g., the access control unit, remote administrative server, and reader), the logic for ignoring the duplicative exchanges can be executed at the electronic lock. For instance, in FIG. 6, the access control unit 680 can send a first unlock signal to the electronic lock after successful authorization of the second entry access exchange and the reader 690 can send a second unlock signal to the electronic lock after successful authorization of the third entry access exchange. In this case, the electronic lock detects that the first and second unlock signals are for the same user or mobile device and arrive within a timeout interval of one another. Accordingly, the electronic lock ignores the second arriving unlock signal.

In some embodiments, the intention that a user will access a particular entry point can be accurately determined or triggered when the user's mobile device is already within range of two or more networks. For instance, the user's mobile device may have LTE network connectivity, WiFi network connectivity, and Bluetooth network connectivity before the mobile device has moved within range of a beacon that triggers the mobile device entry access message exchanges over the two or more networks. In some such embodiments, the mobile device initiates simultaneous entry access exchanges over the two or more networks to accelerate entry access, wherein the simultaneous exchanges initiate in response to a common or single trigger. It should be noted however that because of device and network limitations each of the simultaneous entry access exchanges may not necessarily initiate at the same millisecond. The mobile device may lack the parallel processing power to initiate the simultaneous exchanges or various resource, network, connection, or protocol preconfiguration may need to occur with different completion times prior to actually sending the entry access messages over the networks. In any event, the simultaneous exchanges accelerate entry access by not restricting completion time to performance a single network, but rather taking advantage of the performance offered by different networks and allowing the entry access to complete with the fastest of the available networks.

Figure 7:
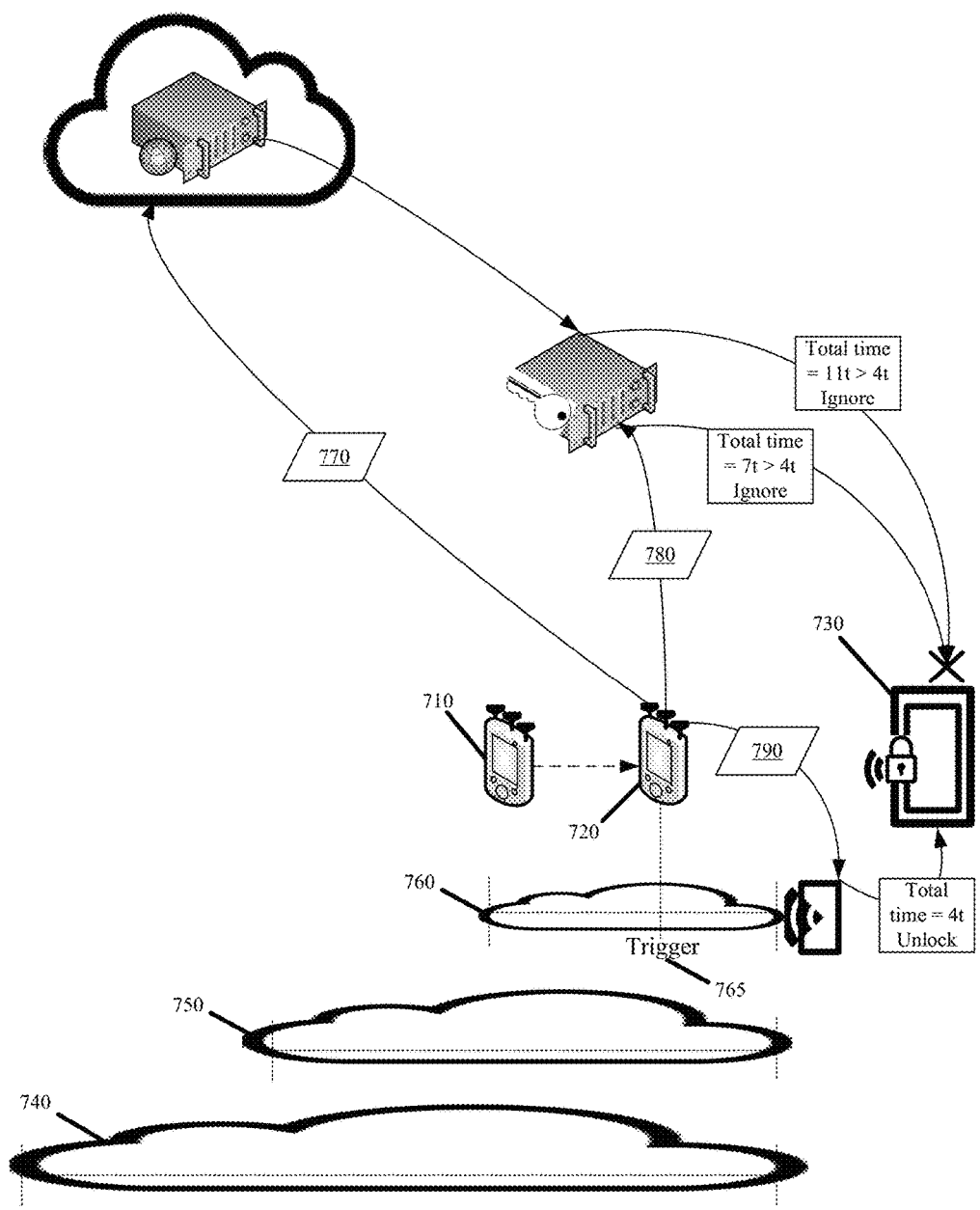
FIG. 7 conceptually illustrates accelerating entry access through simultaneous entry access exchanges conducted over multiple networks in accordance with some embodiments.

FIG. 7 conceptually illustrates accelerating entry access through simultaneous entry access exchanges conducted over multiple networks in accordance with some embodiments. The figure illustrates the mobile device at two different locations 710 and 720 relative to an entry point 730.

At the first location 710, the mobile device is in range of an LTE first network 740, a WiFi second network 750, and a Bluetooth third network 760. The Bluetooth third network 760 involves a connection with a reader that is adjacent to the entry point 730. The entry access exchange is not triggered at the first location 710 because of the distance between the mobile device and the reader as determined from the Bluetooth third network 760 signal strength. The distance is determined to be too large to accurately determine that the user will access the entry point.

At the second location 720, the mobile device moves closer to the reader. The reduced distance between the mobile device and the reader increases the Bluetooth third network 760 signal strength past a threshold that accurately predicts that the user will access the entry point. Consequently, a trigger 765 causes the mobile device to simultaneously initiate a first entry access exchange 770 over the LTE first network 740, a second entry access exchange 780 over the WiFi second network 750, and a third entry access exchange 790 over the Bluetooth third network 760. In some embodiments, the reader monitors the strength of the Bluetooth connection or signal to the mobile device and sends the trigger 765 to the mobile device once the signal strength exceeds the threshold. In some other embodiments, the mobile device monitors the strength of the Bluetooth connection or signal to the reader and internally fires the trigger 765 when the single strength exceeds the threshold. The trigger 765 can alternatively fire and initiate the entry access exchanges 770-790 over the different networks 740-760 in response to a beacon, a user initiated action, or any other internal or external trigger for determining user intention or location.

The first entry access exchange 770 over the LTE first network 740 passes through the remote administrative server to the access control unit of the building for an authorization decision to be made at the access control unit. The second entry access exchange 780 over the WiFi second network 750 passes to the access control unit over the LAN for an authorization decision to be made at the access control unit. The third entry access exchange 790 over the Bluetooth third network 760 passes to the reader for an authorization decision to be made at the reader if the reader is a standalone reader or is forwarded to the local access control unit for the authorization decision if the reader is a networked reader. The multi-network entry access system provides access based on the third entry access exchange 790, because it is the first of the three exchanges 770-790 that successfully completes. The system ignores the results or cancels processing of the other two exchanges 770 and 780 because of the earlier completion of the third exchange 790 which renders the other two exchanges 770 and 780 superfluous.

Changing network conditions, device loads, and unexpected failures may alter the start-to-unlock performance of the different networks 740-760 such that the fastest performing network changes over time. Nevertheless, initiating the simultaneous entry access exchanges over two or more of the available networks guarantees that the user or mobile device receives the fastest entry access.

Figure 8:
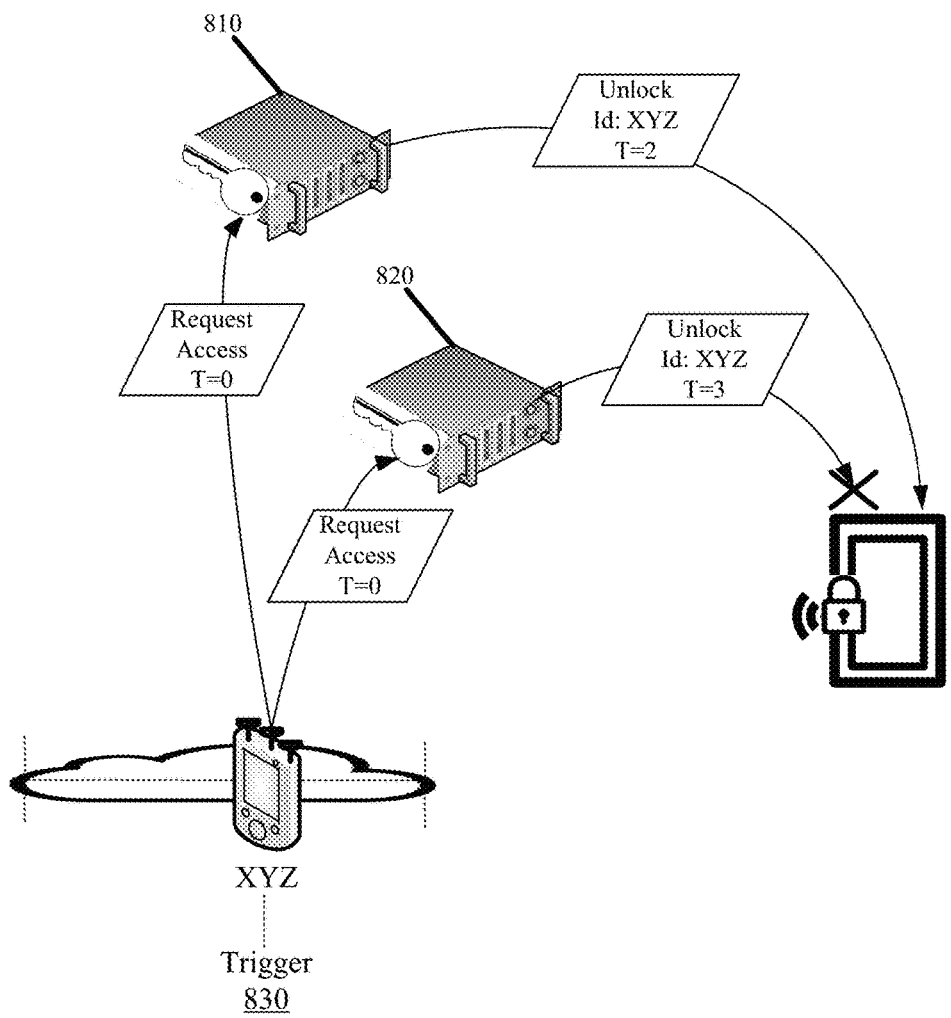
FIG. 8 conceptually illustrates accelerating entry access through simultaneous entry access exchanges conducted with redundant access authorization devices in accordance with some embodiments.

Redundancy and failover can be built into the multi-network entry access control system to mitigate slowdowns from device failures or excess device loads. FIG. 8 conceptually illustrates accelerating entry access through simultaneous entry access exchanges conducted with redundant access authorization devices in accordance with some embodiments. In this figure, the multi-network entry access control system is modified with parallel and redundant access control units 810 and 820. Each access control unit 810 or 820 is accessible over the same one or more networks, but is independently addressable.

A trigger 830 causes the mobile device to simultaneously or contemporaneously exchange entry access messaging over a particular network with each of the access control units 810 and 820. If operational, both access control units 810 and 820 attempt to authorize access for the mobile device based on the exchanges. The faster performing of the access control units 810 or 820 executes the action while the slower performing of the access control units 810 or 820 redundantly executes the action where it can be ignored at the electronic lock. For instance, access control unit 810 issues a first unlock command with a particular mobile device identifier at a first time and access control unit 820 issues a second unlock command with the same particular mobile device identifier at a later second time. The electronic lock receives the first unlock command and opens entry point access in response. The electronic lock then receives the second unlock command and determines that it is within a timeout threshold and therefore ignores the second unlock command.

The simultaneous exchanges with the redundant access control units 810 and 820 allows the mobile device to gain access even when there is a failure at one of the access control units 810 or 820. This is similar to the redundancy provided by performing the message exchanges over the different networks, wherein the failure of one network does not block the exchange from completing over another network. In the illustrated scenario of FIG. 8, the redundancy is provided within a single network for different access authorization devices therein. It should be noted that the methodologies can be combined such that simultaneous or prioritized access entry message exchanges performed by the mobile device occur over multiple networks and with multiple redundant devices on the same network.

Server, computer, and computing machine are meant in their broadest sense, and can include any electronic device with a processor including cellular telephones, smartphones, portable digital assistants, tablet devices, laptops, notebooks, and desktop computers. Examples of computer-readable media include, but are not limited to, CD-ROMs, flash drives, RAM chips, hard drives, EPROMs, etc.

Figure 9:
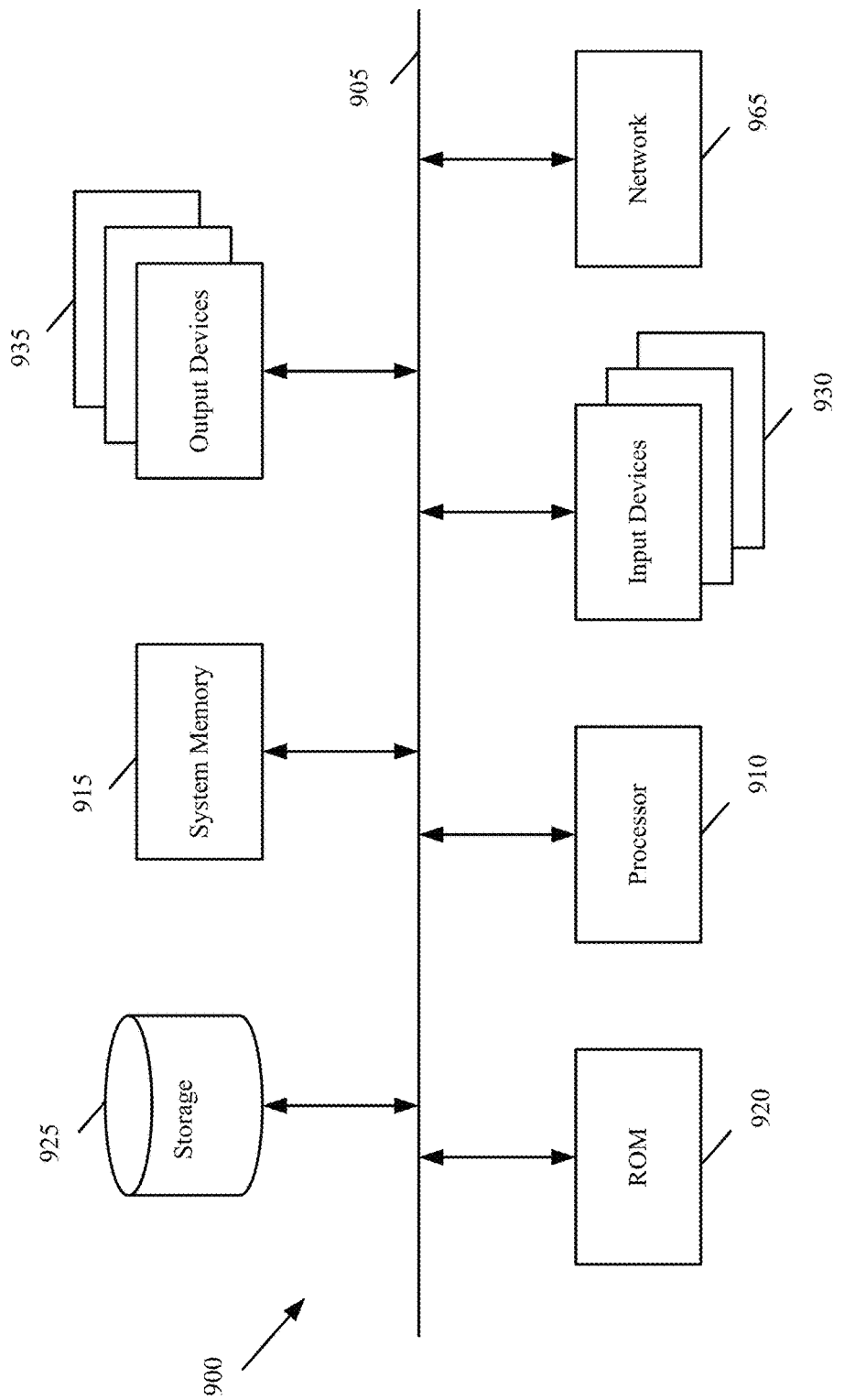
FIG. 9 illustrates a computer system or server with which some embodiments are implemented.

FIG. 9 illustrates a computer system or server with which some embodiments are implemented. Such a computer system includes various types of computer-readable mediums and interfaces for various other types of computer-readable mediums that implement the various methods and machines described above (e.g., request director, caching server, etc.). Computer system 900 includes a bus 905, a processor 910, a system memory 915, a read-only memory 920, a permanent storage device 925, input devices 930, and output devices 935.

The bus 905 collectively represents all system, peripheral, and chipset buses that communicatively connect the numerous internal devices of the computer system 900. For instance, the bus 905 communicatively connects the processor 910 with the read-only memory 920, the system memory 915, and the permanent storage device 925. From these various memory units, the processor 910 retrieves instructions to execute and data to process in order to execute the processes of the invention. The processor 910 is a processing device such as a central processing unit, integrated circuit, graphical processing unit, etc.

The read-only-memory (ROM) 920 stores static data and instructions that are needed by the processor 910 and other modules of the computer system. The permanent storage device 925, on the other hand, is a read-and-write memory device. This device is a non-volatile memory unit that stores instructions and data even when the computer system 900 is off. Some embodiments of the invention use a mass-storage device (such as a magnetic or optical disk and its corresponding disk drive) as the permanent storage device 925.

Other embodiments use a removable storage device (such as a flash drive) as the permanent storage device Like the permanent storage device 925, the system memory 915 is a read-and-write memory device. However, unlike storage device 925, the system memory is a volatile read-and-write memory, such as random access memory (RAM). The system memory stores some of the instructions and data that the processor needs at runtime. In some embodiments, the processes are stored in the system memory 915, the permanent storage device 925, and/or the read-only memory 920.

The bus 905 also connects to the input and output devices 930 and 935. The input devices enable the user to communicate information and select commands to the computer system. The input devices 930 include alphanumeric keypads (including physical keyboards and touchscreen keyboards), pointing devices. The input devices 930 also include audio input devices (e.g., microphones, MIDI musical instruments, etc.). The output devices 935 display images generated by the computer system. The output devices include printers and display devices, such as cathode ray tubes (CRT) or liquid crystal displays (LCD).

Finally, as shown in FIG. 9, bus 905 also couples computer 900 to a network 965 through a network adapter (not shown). In this manner, the computer can be a part of a network of computers (such as a local area network ("LAN"), a wide area network ("WAN"), or an Intranet, or a network of networks, such as the Internet).

As mentioned above, the computer system 900 may include one or more of a variety of different computer-readable media. Some examples of such computer-readable media include RAM, ROM, read-only compact discs (CD-ROM), recordable compact discs (CD-R), rewritable compact discs (CD-RW), read-only digital versatile discs (e.g., DVD-ROM, dual-layer DVD-ROM), a variety of recordable/rewritable DVDs (e.g., DVD-RAM, DVD-RW, DVD+RW, etc.), flash memory (e.g., SD cards, mini-SD cards, micro-SD cards, etc.), magnetic and/or solid state hard drives, ZIP® disks, read-only and recordable blu-ray discs, any other optical or magnetic media, and floppy disks.

In the preceding specification, various preferred embodiments have been described with reference to the accompanying drawings. It will, however, be evident that various modifications and changes may be made thereto, and additional embodiments may be implemented, without departing from the broader scope of the invention as set forth in the claims that follow. The specification and drawings are accordingly to be regarded in an illustrative rather than restrictive sense.

We claim:

1. A method comprising:
   receiving, at a first time, a first wireless signal on a first radio of a mobile device as a first trigger;
   selecting a first network from a plurality of networks in response to said receiving the first wireless signal;
   sending from the mobile device in response to the first trigger, a first message authorizing access to an entry point, wherein said sending the first message comprises sending the first message through the first network using the first wireless radio of the mobile device;
   receiving, at a second time, a second wireless signal on a different second radio of the mobile device as a different second trigger, wherein the second time is after the first time;
   sending from the mobile device in response to the second trigger, a second message authorizing access to said entry point; and
   unlocking access to said entry point in response to successful authorization of at least one of the first message and the second message.

2. The method of claim 1 further comprising selecting a different second network from the plurality of networks in response to said receiving the second wireless signal, and wherein said sending the second message comprises sending the second message through the second network using the second wireless radio of the mobile device.

3. The method of claim 1 further comprising detecting the first trigger in response to receiving user input with a sensor of the mobile device.

4. The method of claim 1 further comprising authorizing access permissions of the mobile device or a user associated with the mobile device at the first time in response to said first message, and confirming intent to access the entry point at the second time in response to said second message, wherein said authorizing and said confirming are performed independently.

5. The method of claim 1, wherein the second message is a redundant copy of the first message, and wherein said sending the first message comprises sending the first message to a first access control unit controlling access to the entry point, and wherein said sending the second message comprises sending the second message to a different second access control unit also controlling access to the entry point.

6. The method of claim 1 further comprising detecting the first trigger in response to receiving a first user action or a first location, and detecting the second trigger in response to receiving a second user action or a second location.

7. A method comprising:
   configuring a first trigger that initiates a first wireless message exchange between a mobile device and at least one controller controlling access to an entry point;
   selecting a first network from a plurality of networks in response to said configuring the first trigger;
   sending the first trigger to the mobile device over the first network;
   configuring a second trigger that initiates a second wireless message exchange between the mobile device and the at least one controller controlling access to the entry point; and
   passing unlock signaling from the at least one controller to the entry point in response to the at least one controller successfully authorizing access based on completing the first wireless message exchange before the second wireless exchange with the mobile device, or completing the second wireless exchange with the mobile device before the first wireless exchange, and wherein the unlock signaling unlocks access to the entry point.

8. The method of claim 7 further comprising sending a first wireless signal from a first location in response to said configuring the first trigger, and sending a different second wireless signal from a second location in response to said configuring the second trigger.

9. The method of claim 7 further comprising sending the second trigger over a different second wireless network in response to said configuring the second trigger.

10. The method of claim 7 further comprising conducting the first wireless message exchange between the mobile device and the at least one access control unit over the first network, and conducting the second wireless message exchange between the mobile device and the at least one access control unit over a second network.

11. A method comprising:
    detecting a particular trigger that is issued to a mobile device;
    selecting at least a first network path from a plurality of network paths in response to said detecting the particular trigger;
    exchanging a first wireless access authorization message with the mobile device over the first network path in response to said detecting;
    exchanging a second wireless access authorization message with the mobile device over a different second network path in response to said detecting and contemporaneously with said exchanging of the first wireless access authorization message; and
    unlocking an entry point based on successful authorization of at least one of the first wireless access authorization message and the second wireless access authorization message.

12. The method of claim 11, wherein said exchanging over the first network path comprises passing the first wireless access authorization message over a first wireless network, and said exchanging over the second network path comprises passing the second wireless access authorization message over a different second wireless network.

13. The method of claim 11, wherein said exchanging over the first network path comprises receiving the first wireless access authorization message at a first access control unit controlling access to the entry point, and wherein said exchanging over the second network path comprises receiving the second wireless access authorization message at a different second access control unit controlling access to the entry point.

14. A method comprising:
    detecting a first trigger with a mobile device at a first time;
    selecting a first network from a plurality of networks in response to said detecting the first trigger;
    sending from the mobile device over the first network in response to said detecting of the first trigger, a first message authorizing access to an entry point;
    authorizing access permissions of the mobile device or a user associated with the mobile device at the first time in response to the first message;
    detecting a different second trigger with said mobile device at a second time after said first time;
    sending from the mobile device in response to said detecting of the second trigger, a second message authorizing access to said entry point;

confirming intent to access the entry point at the second time in response to the second message, wherein said authorizing and said confirming are performed independently; and unlocking access to said entry point in response to successfully completing said authorizing and said confirming.

15. A method comprising:

configuring a first trigger that initiates a first wireless message exchange between a mobile device and at least one controller controlling access to an entry point;

selecting a first network from a plurality of networks in response to said configuring the first trigger;

sending the first trigger to the mobile device over the first network;

configuring a second trigger that initiates a second wireless message exchange between the mobile device and the at least one controller controlling access to the entry point; and passing unlock signaling from the at least one controller to the entry point in response to the at least one controller successfully authorizing access based on completing a first phase of access authorization with the first wireless message exchange, and completing an independent and separate second phase of the access authorization with the second wireless message exchange, wherein the unlock signaling unlocks access to the entry point.

* * * * *